(12) United States Patent
Tashiro

(10) Patent No.: US 8,363,142 B2
(45) Date of Patent: Jan. 29, 2013

(54) IMAGE PICKUP APPARATUS AND READING METHOD THEREOF

(75) Inventor: Kazuaki Tashiro, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 12/819,955

(22) Filed: Jun. 21, 2010

(65) Prior Publication Data

US 2010/0328511 A1 Dec. 30, 2010

(30) Foreign Application Priority Data

Jun. 24, 2009 (JP) ................................ 2009-149805

(51) Int. Cl.
*H04N 5/335* (2011.01)
(52) U.S. Cl. ........................................ 348/308; 348/301
(58) Field of Classification Search .................. 348/308, 348/207.99, 311, 230.1, 241, 294, 300, 301, 348/229.1, 222.1; 382/274; 250/208.1; 257/59, 257/72, 291, 296
See application file for complete search history.

(56) References Cited

U.S. PATENT DOCUMENTS

| | | | |
|---|---|---|---|
| 2005/0146617 A1* | 7/2005 | Hashimoto et al. | 348/207.99 |
| 2005/0280730 A1* | 12/2005 | Lim et al. | 348/308 |
| 2008/0122962 A1* | 5/2008 | Shah | 348/308 |
| 2008/0218621 A1* | 9/2008 | Cho et al. | 348/308 |

FOREIGN PATENT DOCUMENTS

JP  2005-210701 A  8/2005

* cited by examiner

*Primary Examiner* — Tuan Ho
(74) *Attorney, Agent, or Firm* — Canon U.S.A., Inc. IP Division

(57) ABSTRACT

An apparatus includes a plurality of pixels including a photoelectric conversion unit and a pixel amplification unit for amplifying a signal transmitted from the photoelectric conversion unit and outputting an amplified signal, a sequential averaging unit configured to sequentially average signals read a plurality of times via the pixel amplification unit, and a memory configured to store a signal obtained by sequential averaging.

5 Claims, 5 Drawing Sheets

IMAGE PICKUP APPARATUS AND READING METHOD THEREOF

BACKGROUND OF THE INVENTION

1. Field of the Invention

The present invention relates to image pickup apparatuses, and, more particularly, to an image pickup apparatus capable of reducing random noise and a reading method of the image pickup apparatus.

2. Description of the Related Art

In current years, image pickup apparatuses having a total number of pixels exceeding ten million pixels are used for digital still cameras for mainly capturing still images, and image pickup apparatuses having several million pixels are used for movie cameras for mainly capturing moving images. As such an image pickup apparatus, a photoelectric conversion apparatus is used.

In such an image pickup apparatus, the increase in the number of pixels is achieved by the reduction in the size of each pixel. As a result, however, the opening area of each pixel is reduced. This leads to low sensitivity and optical shot noise. Furthermore, with the decrease in the amount of electric charge processed by pixels, noise caused by an image pickup apparatus has become more pronounced.

The noise reduction configurations of amplifying image pickup apparatuses having an amplification unit in each pixel are known. With such a noise reduction configuration, it is possible to reduce fixed pattern noise caused by an amplification unit in each pixel to an allowable image level. With the reduction in the size of each pixel, the size of a MOS transistor functioning as an amplification unit in the pixel is also reduced and the problem of 1/f noise, which is a kind of random noise, arises. The 1/f noise increases in inversely proportional to the size of a MOS transistor.

Currently, in amplifying image pickup apparatuses having a smaller pixel size, new noise occurs. That is, when the relationship between a channel length L of a MOS transistor and a channel width W of the MOS transistor satisfies LW<1 $\mu m^2$, noise called Random Telegraph Signal (RTS), which is a kind of random noise, becomes predominant. This leads to the reduction in image quality. A specific pixel having two or more valued noise appears on a screen at a certain probability as the RTS noise. When such a specific pixel is observed for a predetermined period at a low illumination level, it looks as if the flicker of a pixel occurs. Accordingly, the RTS noise is also called flicker noise.

Japanese Patent Laid-Open No. 2005-210701 discloses a random noise reduction configuration. In a disclosed random noise reduction method using a circuit, the reduction in noise caused by a pixel amplification unit is achieved by reading each of noise and a signal from the same pixel a plurality of times and averaging them.

In order to effectively reduce random noise, since noise is reduced by $1/\sqrt{n}$ (n denotes the number of reading times), it is desirable that the number of reading times be increased. In the related art, however, in order to increase the number of reading times, it is necessary to increase the number of averaging memories in accordance with the number of reading times. This leads to the increase in a chip area.

SUMMARY OF THE INVENTION

The present invention provides a method of an apparatus of reducing random noise by reading, from a single pixel having a pixel amplification unit, a signal m (m is an integer equal to or larger than three) times and averaging read signals. The reading method includes storing a first signal obtained in (m−2)th reading in a first capacitor, storing a second signal obtained in (m−1)th reading in a second capacitor, averaging the first signal and the second signal to produce an averaged signal, storing a third signal obtained in mth reading in one of the first capacitor and the second capacitor, and averaging the third signal and the averaged signal.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

First Embodiment

Figure 1:
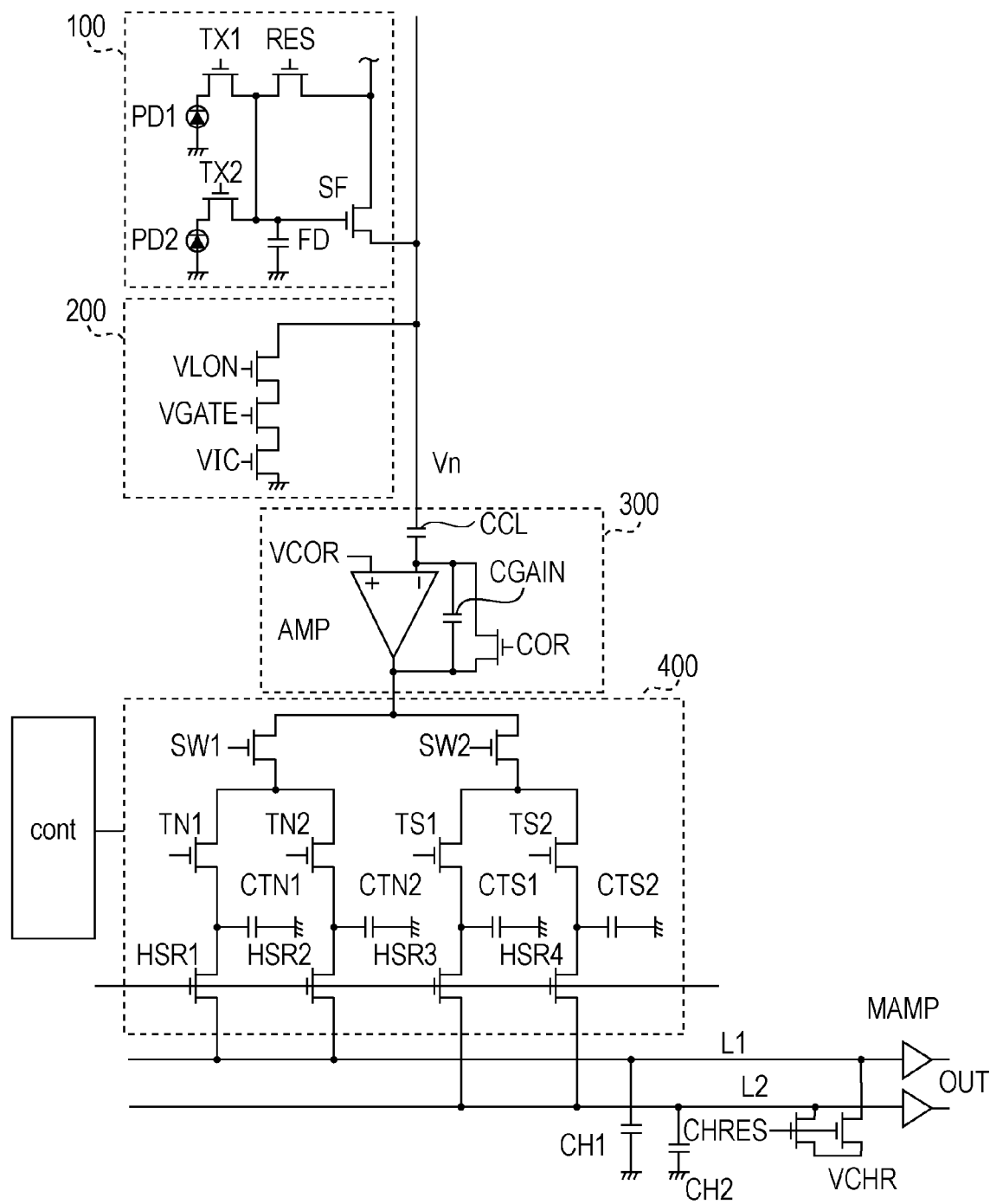
FIG. 1 is a circuit diagram of an image pickup apparatus according to a first embodiment of the present invention including a sequential averaging circuit using a temporary memory.
Figure 2:
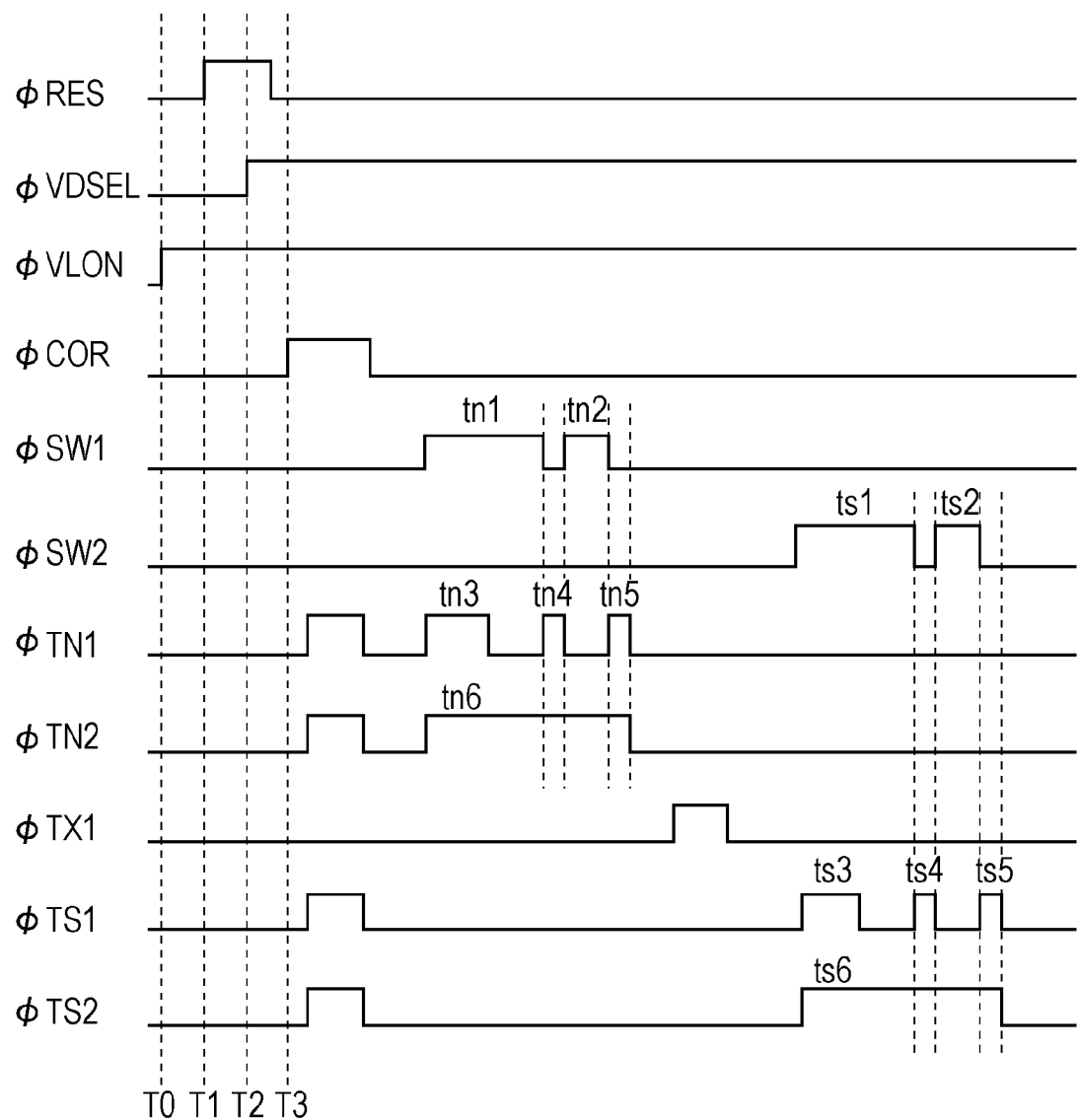
FIG. 2 is a timing chart according to the first embodiment of the present invention.
Figure 3:
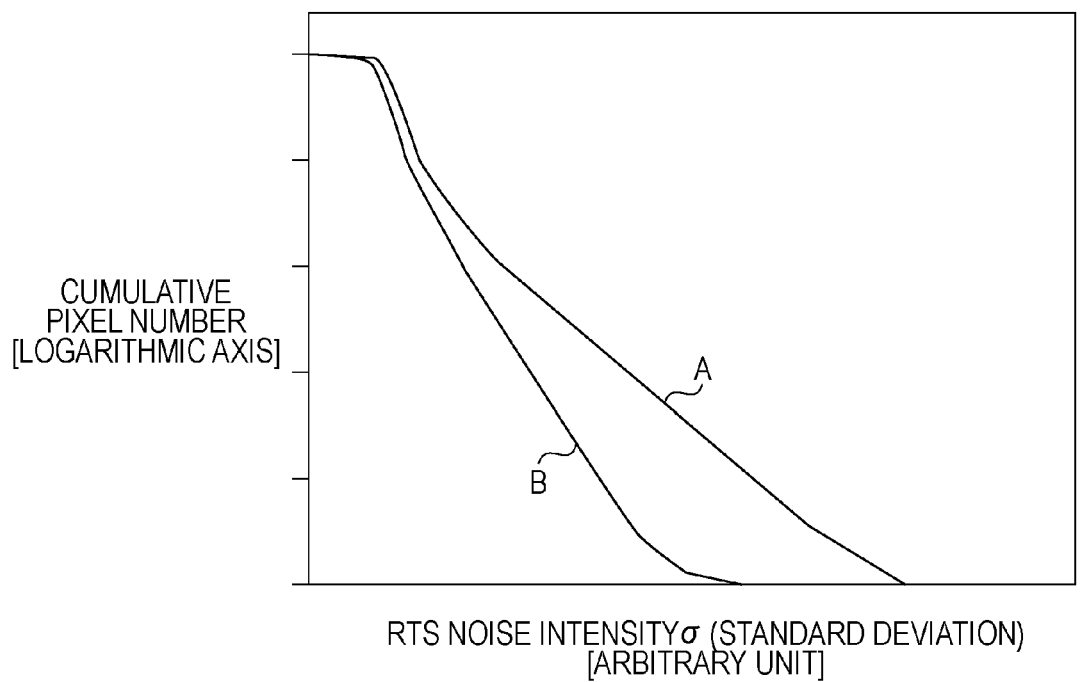
FIG. 3 is a diagram illustrating the effect of reduction in RTS noise.

FIG. 1 is a schematic diagram illustrating a pixel block and a noise reduction circuit connected to a vertical signal line in an image pickup apparatus according to the first embodiment of the present invention. FIG. 2 is a driving timing diagram. FIG. 3 is a diagram describing the effect of reduction in RST noise that is a kind of random noise. The first embodiment of the present invention will be described below with reference to these drawings.

Referring to FIG. 1, in each of unit cells 100 arranged in a pixel region, a pixel amplification unit is shared by a plurality of photoelectric conversion elements. A pixel pitch is, for example, 2 μm in vertical and horizontal directions. When the pixel pitch is equal to or less than 2 μm, RTS noise tends to be high. Accordingly, when the present invention is applied to an image pickup apparatus having a pixel pitch of 2 μm or less, a high degree of effectiveness can be obtained. The pixel pitch is a pitch between adjacent photoelectric conversion elements.

A current source circuit 200 is disposed for each pixel column, and forms a part of a source follower circuit along with the pixel amplification unit.

A column amplification unit 300 is disposed for each pixel column and includes a clamp circuit and a column amplification circuit. The column amplification unit 300 can suppress pixel reset noise (kTC noise) and fixed pattern noise ΔVth which is caused by the variation in the threshold voltage of a MOS transistor forming the pixel amplification unit. The column amplification circuit can obtain a signal level at which noise generated by a circuit subsequent to the column amplification circuit is negligible.

A noise reduction circuit 400 includes storage memories and addition switches as a sequential averaging unit according to an embodiment of the present invention. As the storage memory, a PN junction capacitor formed on a semiconductor substrate or a MOS capacitor may be used. The noise reduction circuit 400 is disposed for each pixel column of the unit cells 100 or a plurality of pixel columns of the unit cells 100 in the pixel region. The input node of the noise reduction circuit 400 is connected to the output node of the column amplification unit 300.

The noise reduction circuit 400 according to the first embodiment includes a circuit for sequentially adding noise signals N and optical signals S' and calculating the average of the noise signals N and the average of the optical signals S'.

The noise signals N and the optical signals S' which have been read from the unit cell 100 a plurality of times in a single horizontal blanking period are stored in the storage memories. Each of the noise signals N includes any one of the reset noise kTC, the fixed pattern noise ΔVth, random noise RN, and fixed pattern noise ΔVoffset, or preferably includes all of them. Each of the optical signals S' includes the reset noise kTC, the fixed pattern noise ΔVth, the fixed pattern noise ΔVoffset, noise RN', and a photoelectric conversion signal S. The fixed pattern noise ΔVoffset is caused by the offset of the column amplification circuit. The random noise RN includes components (a heat noise component, a 1/f noise component, and an RTS noise component) generated by the pixel amplification unit, a dark-current noise component, and a heat noise component generated by the column amplification circuit. The noise signals N and the optical signals S' are preferably transferred to horizontal signal lines L1 and L2 at the same time.

In the first embodiment, each of a noise signal and an optical signal is read from the same pixel three times in a single horizontal blanking period. A noise signal obtained in the first reading and a noise signal obtained in the second reading are averaged. The average of the noise signal obtained in the first reading and the noise signal obtained in the second reading and a noise signal obtained in the third reading are averaged. As will be described later, the number of reading times is not limited to three times, and may be three times or more.

Referring to FIG. 1, each of photodiodes PD1 and PD2 functioning as photoelectric conversion elements forms a single pixel.

A transfer MOS transistor TX1 transfers an electric charge generated by photoelectric conversion performed by the photodiode PD1 to an input portion of the pixel amplification unit. A transfer MOS transistor TX2 transfers an electric charge generated by photoelectric conversion performed by the photodiode PD2 to the input portion of the pixel amplification unit.

An amplification MOS transistor SF forms the pixel amplification unit and functions as an input transistor in the source follower circuit.

A floating diffusion FD receives an electric charge transferred from a photodiode via a transfer switch. The floating diffusion FD is electrically connected to the gate of the amplification MOS transistor SF and forms the input portion of the pixel amplification unit.

A reset MOS transistor RES sets the voltage of the input portion of the pixel amplification unit to a reference voltage.

In the first embodiment, the amplification MOS transistor SF is shared by the photodiodes PD1 and PD2.

A reset transistor sets the gate potential of the amplification MOS transistor SF in a pixel row to be selected to a selective potential, so that the selection of the pixel row is performed. The potential of the amplification MOS transistor SF in an unselected pixel is set to a nonselective potential.

A pixel size is 2 μm×2 μm. The relationship between the channel length L of the amplification MOS transistor SF and the channel width W of the amplification MOS transistor SF is $LW<1$ μm$^2$. In the case of this pixel size, the first embodiment is highly effective since the RTS noise is especially noticeable.

Pulse signals ΦTX1, ΦTX2, and ΦRES are supplied to the gates of the transfer MOS transistor TX1, the transfer MOS transistor TX2, and the reset MOS transistor RES, respectively. With such pulse signals, reset, electric charge storage, electric charge transfer, and processing for controlling reading of a signal from a unit cell are performed.

A vertical signal line Vn is connected to the source of the amplification MOS transistor SF. In the first embodiment, a reset transistor controls the gate potential of an amplification transistor so as to select a pixel row. However, the selection of a pixel row may be performed by connecting a selection transistor in series to the source or drain of the amplification transistor and controlling a current supplied to the amplification transistor.

The current source circuit 200 includes constant current setting MOS transistors VGATE and VIC for setting a constant current supplied to a pixel amplification transistor and an on-off control MOS transistor VLON for performing on-off control of a constant current supplied to a signal line. The on-off control MOS transistor VLON, the constant current setting MOS transistor VGATE, and the constant current setting MOS transistor VIC are controlled with pulse signals ΦVLON, ΦVGATE, and ΦVIC, respectively.

The column amplification unit 300 includes a column amplification circuit AMP disposed for each pixel column, a clamp capacitor CCL connected to the inverting input terminal of the column amplification circuit AMP, and a switch COR. The switch COR connects the inverting input terminal of the column amplification circuit AMP and the output terminal of the column amplification circuit AMP to each other so as to cause the column amplification circuit AMP to perform a voltage follower operation, and also has a function of resetting the node of the clamp capacitor CCL connected to the inverting input terminal of the column amplification circuit AMP. The switch COR is controlled with a pulse signal ΦCOR.

The column amplification unit 300 further includes a capacitor CGAIN disposed in a feedback path between the inverting input terminal and the output terminal of the column amplification circuit AMP. The capacitor CGAIN can set the gain of the column amplification circuit AMP. In FIG. 1, only one capacitor is disposed. However, a plurality of capacitors may be disposed so as to achieve a gain variable configuration.

Next, the noise reduction circuit 400 according to the first embodiment of the present invention will be described. An optical signal circuit and a noise signal circuit having similar configurations are disposed. However, only one of the optical signal circuit and the noise signal circuit may be disposed.

A switch SW1 is used to control the addition of the noise signals N. A switch SW2 is used to control the addition of the optical signals S' and is also referred to as a first switch. As the switches SW1 and SW2, MOS transistors can be used. The switches SW1 and SW2 are controlled with pulse signals ΦSW1 and ΦSW2, respectively.

Capacitors CTN1 and CTN2 function as memories for storing the noise signal N. Capacitors CTS1 and CTS2 function as memories for storing an optical signal, and are also referred to as a first memory and a second memory, respectively.

Switches TN1 and TN2 are used to control the transfer of a noise signal transmitted from the column amplification unit 300. Switches TS1 and TS2 are used to control the transfer of an optical signal transmitted from the column amplification unit 300, and are also referred to as a second switch and a third switch, respectively. As the switches TN1, TN2, TS1, and TS2, MOS transistors can be used. The switches TN1, TN2, TS1, and TS2 are controlled with pulse signals ΦTN1, ΦTN2, ΦTS1, and ΦTS2, respectively.

Switches HSR1 and HSR2 are used to transfer a noise signal to the horizontal signal line L1. Switches HSR3 and HSR4 are used to transfer an optical signal to the horizontal signal line L2. As the switches HSR1 to HSR4, MOS transistors can be used. A switch CHRES is used to reset the potential of a horizontal signal line to a potential VCHR. As the switch CHRES, a MOS transistor can be used. An output amplifier MAMP is controlled by supplying the pulse signal ΦHn to the switches HSR1 to HSR4. The pulse signal ΦHn is supplied from a horizontal scanning circuit (not illustrated).

A control unit cont controls the conduction states of the switch SW2 (the first switch), the switch TS1 (the second switch), and the switch TS2 (the third switch) which are included in the optical signal circuit. The control unit cont preferably controls each switch included in the noise signal circuit. Alternatively, the control unit cont may control only switches included in the noise signal circuit. When only the optical signal circuit is disposed, the control unit cont controls switches included in the optical signal circuit. The control unit cont can switch between the following two states. In one state, the first switch is brought into a nonconductive state, and a signal stored in the first memory and a signal stored in the second memory are averaged. In the other state, the first switch is brought into a conductive state, the first or second switch is brought into a conductive state, and a signal transferred from a pixel is stored in the first or second memory. Next, a noise reduction operation will be described below.

FIG. 2 illustrates times at which a main noise signal reading operation and a main optical signal reading operation are performed.

First, a noise signal reading operation will be described. All components are actuated when a high-level pulse is supplied thereto. A pulse ΦVDSEL is used to switch between a selective potential and a nonselective potential to be supplied to the drains of the reset transistor and the amplification transistor. When the pulse ΦVDSEL becomes high, a selective potential is supplied to the drains of the reset transistor and the amplification transistor.

At a time t0, by setting the pulse signal ΦVLON to a high level, a constant current circuit for setting a current value for the vertical signal line Vn is brought into an ON state.

At a time t1, a high-level pulse is supplied to the gate of the reset transistor with the pulse signal ΦRES.

At a time t2, by setting the pulse ΦVDSEL to the high level, a reset voltage is supplied to the gate of the amplification transistor and the floating diffusion via the reset transistor.

At a time t3, by setting the pulse signal ΦCOR to the high level, the switch COR is turned on and the clamp capacitor CCL and the column amplification circuit AMP are reset with a reference potential VC0R. A noise signal (kTC+ΔVth) is supplied from a pixel to the node of the clamp capacitor CCL on the side of the pixel, and a reference potential is supplied to the node of the clamp capacitor CCL on the side of the column amplification circuit AMP.

In a period tn1, by setting the pulse signal ΦSW1 to the high level, the switch SW1 is turned on. In a period tn3, by setting the pulse signal ΦTN1 to the high level, the switch TN1 is turned on. In a period tn6, by setting the pulse signal ΦTN2 to the high level, the switch TN2 is turned on. As a result, a noise signal N1 (ΔVoffset+RN1) obtained in the first reading is stored in the capacitors CTN1 and CTN2.

Subsequently, by setting the pulse signal ΦTN1 to a low level, the switch TN1 is turned off. At that time, the switch SW1 and the switch TN2 remain in the ON state, and a noise signal N2 (ΔVoffset+RN2) obtained in the second reading is stored in the capacitor CTN2. That is, a noise signal obtained in the first reading is stored in the capacitor CTN1, and a noise signal obtained in the second reading is stored in the capacitor CTN2.

In a period tn4, by turning off the switch SW1 and simultaneously turning on the switches TN1 and TN2, the noise signals stored in the capacitors CTN1 and CTN2 are averaged. At that time, since ΔVoffset is fixed pattern noise, it is not changed by the averaging. On the other hand, since RN1 and RN2 are random noise, the average of them is $RN/\sqrt{2}$. Accordingly, a noise signal $\Delta Voffset+RN/\sqrt{2}$ obtained by averaging the noise signal obtained in the first reading and the noise signal obtained in the second reading is stored in the capacitors CTN1 and CTN2.

In a period tn2, by setting the pulse signal ΦSW1 to the high level, the switch SW1 is turned on. In the period tn2, by setting the pulse signal ΦTN1 to the low level, the switch TN1 is turned off and a noise signal N3 (ΔVoffset+RN3) obtained in the third reading is stored in the capacitor CTN2.

In a period tn5, by turning off the switch SW1 and simultaneously turning on the switches TN1 and TN2, the noise signals stored in the capacitors CTN1 and CTN2 are averaged. At that time, since ΔVoffset is fixed pattern noise, it is not changed by the averaging. On the other hand, since $RN/\sqrt{2}$ and RN3 are random noise, the average of them is $RN \cdot \sqrt{3/8}$. Consequently, a noise signal $\Delta Voffset+RN \cdot \sqrt{3/8}$ obtained by averaging the noise signal obtained in the third reading and the average of the noise signal obtained in the first reading and the noise signal obtained in the second reading is stored in the capacitors CTN1 and CTN2.

In the above-described operation, the capacitor CTN1 is used as a memory for storing an averaged noise signal, and the capacitor CTN2 is used as a memory for storing a new noise signal and the averaged noise signal. Since both of the capacitors CTN1 and CTN2 store signals having approximately the same value after averaging, either of the capacitors CTN1 and CTN2 may be used for storage of the next signal.

Next, an optical signal reading operation will be described. After the noise signal reading operation has been completed, by setting the pulse signal ΦTX1 to the high level, the transfer switch is turned on and a photo charge S obtained by photoelectric conversion performed by the photodiode PD1 is transferred to the input portion of the pixel amplification unit.

In a period ts1, by setting the pulse signal ΦSW2 to the high level, the switch SW2 is turned on. In a period ts3, by setting the pulse signal ΦTS1 to the high level, the switch TS1 is turned on. In a period ts6, by setting the pulse signal ΦTS2 to the high level, the switch TS2 is turned on. Consequently, an optical signal S'1 (S+ΔVoffset+RN4) obtained in the first reading is stored in the capacitors CTS1 and CTS2.

Subsequently, by setting the pulse signal ΦTS1 to the low level, the switch TS1 is turned off. At that time, since the switch SW2 and the switch TS2 remain in the ON state, an optical signal S'2 (S+ΔVoffset+RN5) obtained in the second reading is stored in the capacitor CTS2. An optical signal obtained in the first reading is stored in the capacitor CTS1, and an optical signal obtained in the second reading is stored in the capacitor CTS2.

In a period ts4, by turning off the switch SW2 and turning on the switches TS1 and TS2, the optical signals stored in the capacitors CTS1 and CTS2 are averaged. At that time, since S is an optical output and ΔVoffset is fixed pattern noise, they are not changed by the averaging. On the other hand, since RN4 and RN5 are random noise, the average of them is RN/√2. Accordingly, a signal S+ΔVoffset+RN'/√2 obtained by averaging the optical signal obtained in the first reading and the optical signal obtained in the second reading is stored in the capacitors CTS1 and CTS2.

In a period ts2, by setting the pulse signal ΦSW2 to the high level, the switch SW2 is turned on. In the period ts2, by setting the pulse signal ΦTS1 to the low level, the switch TS1 is turned off and an optical signal S'3 (S+ΔVoffset+RN6) obtained in the third reading is stored in the capacitor CTS2. An optical signal obtained by averaging the optical signal obtained in the first reading and the optical signal obtained in the second reading is stored in the capacitor CTS1, and the optical signal obtained in the third reading is stored in the capacitor CTS2.

In a period ts5, by turning off the switch SW2 and simultaneously turning on the switches TS1 and TS2, the optical signals stored in the capacitors CTS1 and CTS2 are averaged. At that time, since S is an optical signal and ΔVoffset is fixed pattern noise, they are not changed by the averaging. On the other hand, since RN'/√2 and RN6 are random noise, the average of them is RN'·√(⅜). Consequently, an optical signal S+ΔVoffset+RN'·√(⅜) obtained by averaging the optical signal obtained in the third reading and the average of the optical signal obtained in the first reading and the optical signal obtained in the second reading is stored in the capacitors CTS1 and CTS2.

In the above-described operation, the capacitor CTS1 is used as a memory for storing an averaged optical signal, and the capacitor CTS2 is used as a memory for storing a new optical signal and the averaged optical signal. Since both of the capacitors CTS1 and CTS2 store signals having approximately the same value after averaging, either of the capacitors CTS1 and CTS2 may be used for storage of the next signal.

Pixel rows are subjected to the above-described process in parallel. The noise signal stored in the memory and the optical signal stored in the memory are transferred to the horizontal signal lines L1 and L2, respectively, with the pulse signal ΦHn transferred from the horizontal scanning circuit. At that time, the noise signal (ΔVoffset+RN·√(⅜)) obtained by the averaging and the optical signal (S+ΔVoffset+RN'·√(⅜)) obtained by the averaging are read. The noise signal and the optical signal are externally output from the image pickup apparatus via the output amplifier MAMP.

In the first embodiment, an external signal processing circuit of the image pickup apparatus removes the fixed pattern noise ΔVoffset by performing difference processing. At that time, the sum of squares of the random noise included in the optical signal and the random noise included in the noise signal is calculated.

When averaging is not performed, final random noise RN·√2 is obtained. Using a configuration or method according to the first embodiment, it is possible to reduce the final random noise to RN·√(⅜)·√2=RN·√(¾). Therefore, according to the first embodiment, as compared with a case in which averaging is not performed, noise can be reduced by √(⅜) times.

The effect of the reduction in the random noise RN will be described in detail below. The reason why a result of averaging with signals obtained in the first to third reading is √(⅜) times that obtained when averaging is not performed is as follows.

In general, when voltage signals are subjected to charge addition in a capacitor, voltage values are averaged. When random noise signals that are independent of each other are added, the sum of squares of the random noise signals is calculated. Accordingly, when random noise signals are added in a capacitor, the sum of squares of the random noise signals is calculated and then averaging is performed.

A noise signal σ1 obtained in the first reading, a noise signal σ2 obtained in the second reading, and a noise signal σ3 obtained in the third reading are read from the same pixel. This means that these noise signals are transferred through the same path. Accordingly, these noise signals have the same value as follows.

$$\sigma 1 = \sigma 2 = \sigma 3 = \sigma$$

When the noise signal σ1 and the noise signal σ2 are averaged in a capacitor, the sum of squares of them is calculated since they are independent of each other. Furthermore, averaging is performed two times since voltage addition is performed in the capacitor. A final noise signal σr1 obtained in the first averaging is as follows.

$$\sigma r1 = \sqrt{(\sigma 1^2 + \sigma 2^2)/2} = \sqrt{(2 \times \sigma^2)/2} = \sigma/\sqrt{2}$$

In the second averaging, since a result of the first averaging and the noise signal σ3 obtained in the third reading are averaged, a final noise signal σr2 is calculated as follows.

$$\sigma r2 = \sqrt{\left\{(\sigma/\sqrt{2})^2 + \sigma 3^2\right\}/2}$$
$$= \sqrt{\left\{(\sigma/\sqrt{2})^2 + \sigma^2\right\}/2}$$
$$= \sqrt{\{3/2 \times \sigma^2\}/2}$$
$$= \sqrt{(3/8)} \times \sigma$$

Here, the case in which reading is performed three times has been described. However, in the first embodiment, in order to reduce noise, the above-described averaging process can be performed any number of times by alternately using two memories. An addition method according to the first embodiment is a method of adding the last reading result and a current reading result and adding a result of the addition and the next reading result while switching between at least two memories (capacitors).

The effect of the reduction in random noise has been described. Next, the effect of the reduction in RTS noise will be described below.

FIG. 3 is a cumulative histogram illustrating a dark random noise value σ of each pixel. The horizontal axis represents the dark random noise value σ, and the vertical axis (logarithmic axis) represents the normalized cumulative number of pixels. A curve A represents a case in which averaging according to the first embodiment is not performed, and a curve B represents a case in which each of a noise signal and an optical signal is read three times and sequential averaging is performed with the read signals. An exponential distribution portion (linear portion) at the bottom corresponds to RTS noise. In general, the value σ of RTS noise is proportional to a flicker frequency and a noise intensity. An RTS noise portion corresponds to a specific pixel.

In an image pickup apparatus, a final dark random noise component includes a dark-current noise component, a heat noise component in the column amplification circuit, and a heat noise component in the output amplifier in addition to a noise component in the pixel amplification unit. In the case of the dark-current noise component and the heat noise component in the output amplifier, the effect of averaging according to the first embodiment cannot be obtained. The effect of the reduction in dark random noise can be obtained only in the case of the noise component in the pixel amplification unit and the noise component in the column amplification circuit.

As described previously, the value σ of RTS noise is determined in accordance with the frequency and intensity of noise at a specific pixel. The distribution of the value σ of RTS noise is exponential. Accordingly, when the reduction in the intensity of random noise according to the first embodiment is performed, the number of specific pixels on the entire screen can be exponentially reduced. By reading each of a noise signal and an optical signal three times and performing sequential averaging with read signals, the number of flickering pixels can be markedly reduced. It is therefore possible to significantly improve a visible flicker state.

When the correction of RTS noise is performed upon a large number of specific pixels, a large number of memories are required. Accordingly, according to the first embodiment, it is possible to significantly reduce RTS noise without increasing the number of memories.

In the first embodiment, reading and averaging can be performed any number of times in a horizontal blanking period. When the number of reading times is increased to the extent possible by changing a driving condition, it is possible to further reduce RTS noise.

The off periods of the switches TN1 and TN2 do not overlap each other in the first embodiment, but may partially overlap each other. It is considered that RTS noise occurs at a certain time in a pixel reading period. When different pixel reading periods are set, there may be no correlation between RTS noises included in signals read in the different pixel reading periods. In this case, according to the first embodiment, the effect of the reduction in RTS noise can be obtained.

Second Embodiment

Figure 4:
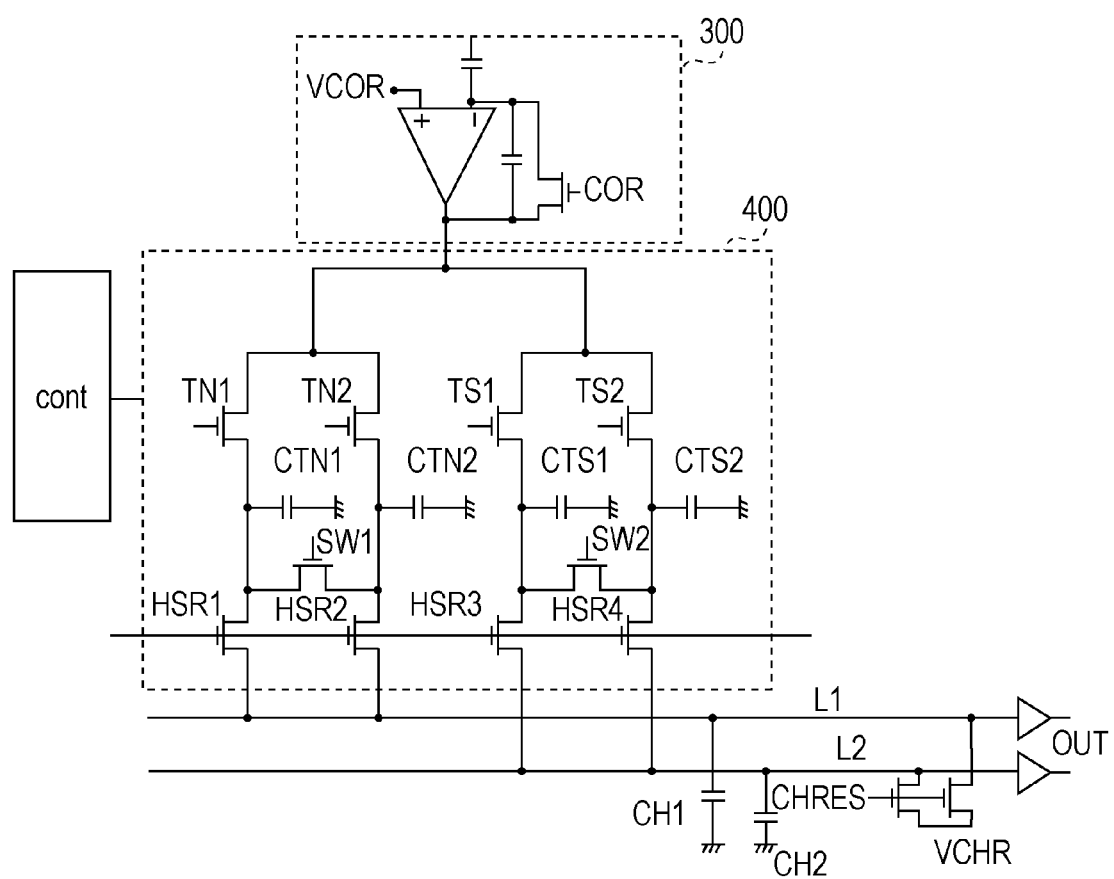
FIG. 4 is a circuit diagram of an image pickup apparatus according to a second embodiment of the present invention including a sequential averaging circuit using a temporary memory.

FIG. 4 is a diagram illustrating a circuit including an averaging circuit unit according to the second embodiment of the present invention. In FIG. 4, the same reference numerals are used to identify parts already described with reference to FIG. 1, and the description thereof will be therefore omitted. The difference between the first embodiment and the second embodiment is that the switches SW1 and SW2 used for averaging are disposed at subsequent stages of the capacitors CTN and CTS, respectively, in the second embodiment.

Figure 5:
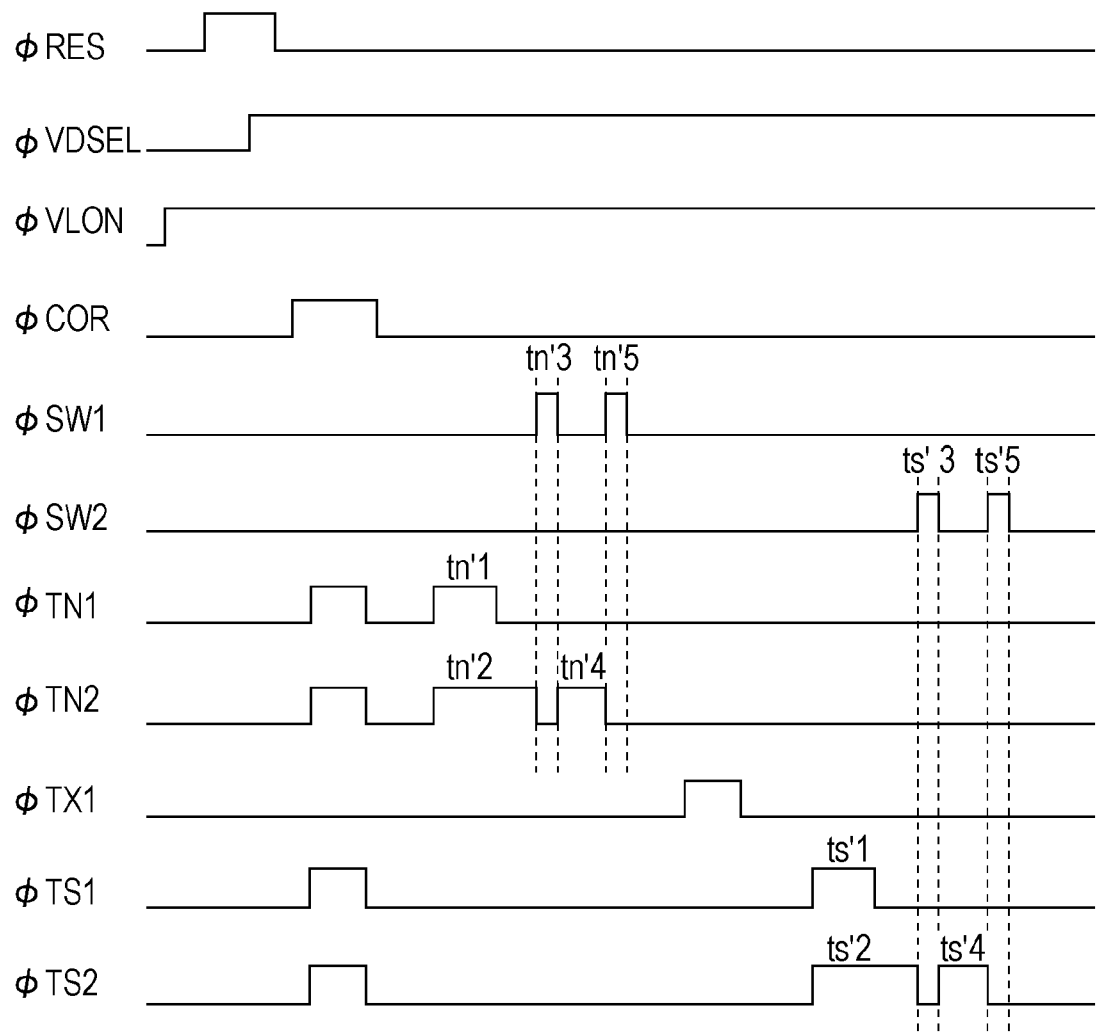
FIG. 5 is a timing chart according to the second embodiment of the present invention.

First, a noise signal reading operation will be described with reference to FIG. 5. Portions common to those in the first embodiment are not described here.

In a period tn'1, by setting the pulse signal ΦTN1 to a high level, the switch TN1 is turned on. In a period tn'2, by setting the pulse signal ΦTN2 to the high level, the switch TN2 is turned on. Consequently, the noise signal N1 (ΔVoffset+RN1) obtained in the first reading is stored in the capacitors CTN1 and CTN2.

Subsequently, by setting the pulse signal ΦTN1 to a low level, the switch TN1 is turned off. At that time, since the switch TN2 remains in an ON state, the noise signal N2 (ΔVoffset+RN2) is read in the second reading and is then stored in the capacitor CTN2. A noise signal obtained in the first reading is stored in the capacitor CTN1, and a noise signal obtained in the second reading is stored in the capacitor CTN2.

In a period tn'3, the switch TN2 is turned off by setting the pulse signal ΦTN2 to the low level, and the switch SW1 is turned on by setting the pulse signal ΦSW1 to the high level. In the period tn'3, since the capacitors CTN1 and CTN2 are connected to each other via the switch SW1, the noise signals stored in the capacitors CTN1 and CTN2 are averaged. At that time, since ΔVoffset is fixed pattern noise, it is not changed by the averaging. On the other hand, since RN1 and RN2 are random noise, the average of them is RN/√2. Accordingly, a noise signal ΔVoffset+RN/√2 obtained by averaging the noise signal obtained in the first reading and the noise signal obtained in the second reading is stored in the capacitors CTN1 and CTN2.

Subsequently, by setting the pulse signal ΦSW1 to the low level, the switch SW1 is turned off. In a period tn'4, by setting the pulse signal ΦTN2 to the high level, the switch TN2 is turned on and the noise signal N3 (ΔVoffset+RN3) obtained in the third reading is stored in the capacitor CTN2.

Subsequently, by setting the pulse signal ΦTN2 to the low level, the switch TN2 is turned off. In a period tn'5, by setting the pulse signal ΦSW1 to the high level, the switch SW1 is turned on and the noise signals stored in the capacitors CTN1 and CTN2 are averaged. At that time, since ΔVoffset is fixed pattern noise, it is not changed by the averaging. On the other hand, since RN/√2 and RN3 are random noise, the average of them is RN·√(3/8). Consequently, a noise signal ΔVoffset+RN·√/(3/8) obtained by averaging the noise signal obtained in the third reading and the average of the noise signal obtained in the first reading and the noise signal obtained in the second reading is stored in the capacitors CTN1 and CTN2.

Next, an optical signal reading operation will be described. After the noise signal reading operation has been completed, by setting the pulse signal ΦTX1 to the high level, the transfer switch is turned on and the photo charge S obtained by photoelectric conversion performed by the photodiode PD1 is transferred to the input portion of the pixel amplification unit.

In a period ts'1, by setting the pulse signal ΦTS1 to the high level, the switch TS1 is turned on. In a period ts'2, by setting the pulse signal ΦTS2 to the high level, the switch TS2 is turned on. Consequently, the optical signal S'1 (S+ΔVoffset+RN4) obtained in the first reading is stored in the capacitors CTS1 and CTS2.

Subsequently, by setting the pulse signal ΦTS1 to the low level, the switch TS1 is turned off. At that time, since the switch TS2 remains in the ON state, the optical signal S'2 (S+ΔVoffset+RN5) is read in the second reading and is then stored in the capacitor CTS2. An optical signal obtained in the first reading is stored in the capacitor CTS1, and an optical signal obtained in the second reading is stored in the capacitor CTS2.

In a period ts'3, the switch TS2 is turned off by setting the pulse signal ΦTS2 to the low level and the switch SW2 is turned on by setting the pulse signal ΦSW2 to the high level. In the period ts'3, the capacitors CTS1 and CTS2 are connected to each other via the switch SW2. The optical signals stored in the capacitors CTS1 and CTS2 are averaged. At that time, since S is an optical output and ΔVoffset is fixed pattern noise, they are not changed by the averaging. On the other hand, since RN4 and RN5 are random noise, the average of them is RN/√2. Accordingly, the signal S+ΔVoffset+RN'/√2 obtained by averaging the optical signal obtained in the first reading and the optical signal obtained in the second reading is stored in the capacitors CTS1 and CTS2.

Subsequently, by setting the pulse signal ΦSW2 to the low level, the switch SW2 is turned off. In a period ts'4, by setting the pulse signal ΦTS2 to the high level, the switch TS2 is turned on. Consequently, the optical signal S'3 (S+ΔVoffset+RN6) obtained in the third reading is stored in the capacitor CTS2. An optical signal obtained by averaging the optical signal obtained in the first reading and the optical signal obtained in the second reading is stored in the capacitor CTS1, and the optical signal obtained in the third reading is stored in the capacitor CTS2.

Subsequently, by setting the pulse signal ΦTS2 to the low level, the switch TS2 is turned off. In a period ts'5, by setting the pulse signal ΦSW2 to the high level, the switch SW2 is turned on and the optical signals stored in the capacitors CTS1 and CTS2 are averaged. At that time, since S is photo charge and ΔVoffset is fixed pattern noise, they are not changed by the averaging. On the other hand, since RN'/√2 and RN6 are random noise, the average of them is RN'·√(3/8). Consequently, the optical signal S+ΔVoffset+RN'·√(3/8) obtained by averaging the optical signal obtained in the third reading and the average of the optical signal obtained in the first reading and the optical signal obtained in the second reading is stored in the capacitors CTS1 and CTS2.

Pixel rows are subjected to the above-described process in parallel. The noise signal stored in the memory and the optical signal stored in the memory are transferred to the horizontal signal lines L1 and L2, respectively, with the pulse signal ΦHn transferred from the horizontal scanning circuit. At that time, the noise signal (ΔVoffset+RN·√(3/8)) obtained by the averaging and the optical signal (S+ΔVoffset+RN'·√(3/8)) obtained by the averaging are read. The noise signal and the optical signal are externally output from the image pickup apparatus via the output amplifier MAMP.

In the second embodiment, an external signal processing circuit of the image pickup apparatus removes the fixed pattern noise ΔVoffset by performing (S-N) processing. At that time, the sum of squares of the random noise included in the optical signal and the random noise included in the noise signal is calculated.

In the second embodiment, like in the first embodiment, as compared with a case in which averaging is not performed, noise can be reduced by √(3/8) times. By reducing the intensity of random noise, it is possible to exponentially reduce the number of specific pixels having a high RTS noise level on the entire screen.

According to the present invention, it is possible to significantly reduce random noise caused by a pixel amplification unit and RTS noise without increasing the number of memories by reading each of a noise signal and an optical signal from the same pixel a plurality of times and performing sequential averaging with read signals. That is, irrespective of the number of addition times, the effect of noise reduction can be obtained with at least two memories. According to the present invention, it is possible to achieve the number of memories smaller than the number of addition times. This leads to the size reduction of a circuit. An inexpensive image pickup apparatus can be therefore provided.

The present invention is not limited to the above-described embodiments. When the present invention is generalized, a random noise reduction method is performed of reading from a single pixel having a pixel amplification unit a signal m (m is an integer equal to or larger than three) times and averaging read signals. First, a signal obtained in the (m−2)th reading is stored in the first capacitor. A signal obtained in the (m−1)th reading is stored in the second capacitor. The signal stored in the first capacitor and the signal stored in the second capacitor are averaged. A signal obtained in the mth reading is stored in one of the first capacitor and the second capacitor. The signal stored in one of the first capacitor and the second capacitor and the averaged signal stored in the other one of the first capacitor and the second capacitor are averaged. The number of reading times may be any number of times equal to or larger than three times to the extent permitted by a reading speed.

In the above-described embodiments, noise generated at a pixel or a column amplifier is suppressed. A sequential averaging method according to the present invention may be applied to a case in which only an optical signal is read. A configuration used in this case will be described.

The configuration excluding the noise signal circuit and the column amplification unit illustrated in FIG. 1 is used in such a case. A first switch corresponding to the switch SW2 illustrated in FIG. 1 is used to receive a signal transmitted from each of a plurality of pixels having a pixel amplification unit from an input node and output the received signal from an output node. A first memory corresponding to the capacitor CTS1 and a second memory corresponding to the capacitor CTS2 are used to store the signal output from the output node of the first switch. A second switch corresponding to the switch TS1 is used to control the electrical continuity between the output node of the first switch and the first memory. A third switch corresponding to the switch TS2 is used to control electrical continuity between the output node of the first switch and the second memory. The control unit cont is used to control conduction of the first, second, and third switches. The control unit cont performs the above-described operation.

In the above-described embodiments, an amplification unit is disposed for each column, but may be disposed for a plurality of columns. Alternatively, a column amplification unit may not be disposed. In this case, a noise reduction method according to the present invention may be directly performed upon a signal read from each pixel. The above described embodiments only show concrete examples in embodying the present invention, and the technical range of the present invention should not be considered as restrictive by these embodiments. Specifically, the present invention may be embodied in various forms without departing from the technical idea or essential characteristics thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149805 filed Jun. 24, 2009, which is hereby incorporated by reference herein in its entirety.

What is claimed is:

1. A method of an apparatus of reducing random noise by reading, from a single pixel having a pixel amplification unit, a signal m (m is an integer equal to or larger than three) times and averaging read signals, comprising:
   storing a first signal obtained in (m−2)th reading in a first capacitor;
   storing a second signal obtained in (m−1)th reading in a second capacitor;
   averaging the first signal and the second signal to produce a first averaged signal;
   storing a third signal obtained in m-th reading in one of the first capacitor and the second capacitor; and
   averaging the third signal and the first averaged signal to produce a second averaged signal.

2. The method according to claim 1, wherein each step is performed upon a signal obtained from the pixel by resetting an input portion of the pixel amplification unit and a signal obtained from the pixel by photoelectric conversion.

3. The method according to claim 1, wherein each step is performed in a single horizontal blanking period.

4. An apparatus comprising:
   a plurality of pixels having a pixel amplification unit;
   a first switch configured to receive a signal from each of the plurality of pixels and output the received signal from an output node;

a first memory configured to store the signal output from the output node;
a second memory configured to store the signal output from the output node;
a second switch configured to control electrical continuity between the output node and the first memory;
a third switch configured to control electrical continuity between the output node and the second memory; and
a control unit configured to control conduction of the first, the second, and the third switches, and
wherein the control unit switches between a first state and a second state, the first state in which the first switch is brought into a nonconductive state and a signal stored in the first memory and a signal stored in the second memory are averaged, the second state in which the first switch is brought into a conductive state, the second switch or the third switch is brought into the conductive state, a signal transmitted from the pixel is stored in the first memory or the second memory.

5. The apparatus according to claim 4,
wherein the pixel amplification unit is a source follower using a MOS transistor, and
wherein a relationship between a channel length L of the MOS transistor and a channel width W of the MOS transistor is $LW<1\ \mu m^2$.

* * * * *